US010576584B2

(12) United States Patent
Sugiyama et al.

(10) Patent No.: US 10,576,584 B2
(45) Date of Patent: Mar. 3, 2020

(54) LASER PROCESSING MACHINE AND LASER PROCESSING METHOD

(71) Applicant: AMADA HOLDINGS CO., LTD., Kanagawa (JP)

(72) Inventors: Akihiko Sugiyama, Kanagawa (JP); Yuya Mizoguchi, Kanagawa (JP); Masahito Ito, Kanagawa (JP); Masato Kunihiro, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/093,048

(22) PCT Filed: Apr. 13, 2017

(86) PCT No.: PCT/JP2017/015073
§ 371 (c)(1),
(2) Date: Oct. 11, 2018

(87) PCT Pub. No.: WO2017/179642
PCT Pub. Date: Oct. 19, 2017

(65) Prior Publication Data
US 2019/0118304 A1 Apr. 25, 2019

(30) Foreign Application Priority Data

Apr. 14, 2016 (JP) .................... 2016-081539
Apr. 10, 2017 (JP) .................... 2017-077515

(51) Int. Cl.
*B23K 26/38* (2014.01)
*B23K 26/064* (2014.01)
(Continued)

(52) U.S. Cl.
CPC .......... *B23K 26/38* (2013.01); *B23K 26/00* (2013.01); *B23K 26/064* (2015.10);
(Continued)

(58) Field of Classification Search
CPC ...... B23K 26/38; B23K 26/064; B23K 26/00; B23K 2103/10; B23K 2101/18;
(Continued)

(56) References Cited

U.S. PATENT DOCUMENTS

2014/0246405 A1 9/2014 Numata et al.
2017/0120391 A1* 5/2017 Schmit .................. B23K 26/26

FOREIGN PATENT DOCUMENTS

JP 11-170077 A 6/1999
JP 2008-264839 A 11/2008
(Continued)

OTHER PUBLICATIONS

Katayama, "Introduction to the Lecture Note—A Class in Joining & Welding, Chapter 1: Welding processes and equipment, (1-4): Laser Welding", Journal of the Japanese Welding Society, vol. 78 (2009), Issue 2, The Japan Welding Society, along with an English translation thereof, Mar. 2009, pp. 124-138.
(Continued)

*Primary Examiner* — Dana Ross
*Assistant Examiner* — Joseph M Baillargeon
(74) *Attorney, Agent, or Firm* — Greenblum & Bernstein, P.L.C.

(57) ABSTRACT

A period of time during which a laser beam moves through an inner region of a beam spot that ranges from a center of the beam spot to an area corresponding to a thermal energy of 44% with respect to a total thermal energy of the beam spot is set as a moving time tp. "c", "ρ", "λ", "T", "T0", "A", and "Pd" respectively represents a specific heat, a density, a thermal conductivity, a melting temperature, an environmental temperature, a light absorptance, and an energy density of the inner region. A time calculated from Equation (1) is set as a melting time tm. A plate thickness is represented by x and a value of tm/tp is represented by y. The (Continued)

value y is set between a lower limit value (Equation (2)) and an upper limit value (Equation (3)).

$$tm = c \times \rho \times \lambda \times \pi [(T-T0)/(2 \times A \times Pd)]^2 \quad (1)$$

$$y = 0.0027 e^{0.36x} \quad (2)$$

$$y = 0.0026 e^{0.4512x} \quad (3)$$

10 Claims, 11 Drawing Sheets

(51) Int. Cl.
 *B23K 26/00* (2014.01)
 *B23K 103/10* (2006.01)
 *B23K 101/18* (2006.01)
(52) U.S. Cl.
 CPC ...... *B23K 2101/18* (2018.08); *B23K 2103/10* (2018.08); *G05B 2219/45041* (2013.01)
(58) Field of Classification Search
 CPC .. B23K 26/0006; B23K 26/02; B23K 26/034; B23K 26/0344; B23K 26/08; B23K 26/36; B23K 26/40; B23K 26/10; B23K 2103/00; G05B 2219/45041
 See application file for complete search history.

(56) References Cited

FOREIGN PATENT DOCUMENTS

| | | | |
|---|---|---|---|
| JP | 2013-094838 A | 5/2013 | |
| JP | 2015-500571 A | 1/2015 | |
| WO | WO-2009007708 A2 * | 1/2009 | ......... B23K 26/0648 |
| WO | 2016/059937 A1 | 4/2016 | |

OTHER PUBLICATIONS

International Search Report issued in International Bureau of WIPO Patent Application No. PCT/JP2017/015073, dated May 16, 2017, along with an English translation thereof.

* cited by examiner

FIG. 6A

MATERIALS A1050

| No. | PLATE THICKNESS (mm) | NOZZLE DIAMETER (mm) | GAS PRESSURE (MPa) | OXYGEN CONCENTRATION (%) | FOCUS OFFSET (mm) | CUTTING SPEED (m/min) |
|---|---|---|---|---|---|---|
| 1 | 4 | 4 | 1.0 | 0.17 | 2.5 | 1.1 |
| 2 | 4 | 4 | 1.0 | 0.17 | 2.5 | 1.3 |
| 3 | 4 | 4 | 1.0 | 0.17 | 2.5 | 1.4 |
| 4 | 4 | 4 | 1.0 | 0.17 | 2.5 | 1.5 |
| 5 | 4 | 4 | 1.0 | 0.17 | 2.5 | 1.7 |
| 6 | 4 | 4 | 1.0 | 0.20 | 2.5 | 1.3 |
| 7 | 4 | 4 | 1.0 | 0.20 | 2.5 | 1.3 |
| 8 | 4 | 4 | 1.0 | 0.20 | 2.5 | 1.3 |
| 9 | 4 | 4 | 1.0 | 0.20 | 2.5 | 1.3 |
| 10 | 3 | 2 | 1.6 | 0.20 | 2.5 | 3.0 |
| 11 | 3 | 2 | 1.6 | 0.20 | 2.5 | 3.2 |
| 12 | 3 | 2 | 1.6 | 0.20 | 2.5 | 3.5 |
| 13 | 3 | 2 | 1.6 | 0.20 | 2.5 | 3.7 |
| 14 | 3 | 2 | 1.6 | 0.20 | 2.5 | 4.0 |
| 15 | 3 | 2 | 1.6 | 0.20 | 2.5 | 4.2 |
| 16 | 3 | 2 | 1.6 | 0.20 | 2.5 | 4.5 |
| 17 | 3 | 2 | 1.6 | 0.20 | 2.5 | 3.5 |
| 18 | 3 | 2 | 1.6 | 0.20 | 2.5 | 3.5 |
| 19 | 3 | 2 | 1.6 | 0.20 | 2.5 | 3.5 |
| 20 | 2 | 2 | 1.6 | 0.40 | 2.0 | 6.5 |
| 21 | 2 | 2 | 1.6 | 0.40 | 2.0 | 7.0 |
| 22 | 2 | 2 | 1.6 | 0.40 | 2.0 | 7.5 |
| 23 | 2 | 2 | 1.6 | 0.40 | 2.0 | 8.0 |
| 24 | 2 | 2 | 1.6 | 0.40 | 2.0 | 8.5 |
| 25 | 2 | 2 | 1.6 | 0.40 | 2.0 | 9.0 |
| 26 | 2 | 2 | 1.6 | 0.40 | 2.0 | 9.5 |
| 27 | 2 | 2 | 1.6 | 0.40 | 2.0 | 7.5 |
| 28 | 2 | 2 | 1.6 | 0.40 | 2.0 | 7.5 |
| 29 | 2 | 2 | 1.6 | 0.40 | 2.0 | 7.5 |

FIG. 6B

MATERIALS A1050

| No. | 44% SPOT DIAMETER (mm) | POWER DENSITY Pd (W/m$^2$) | MOVING TIME tp (s) | MELTING TIME tm (s) | tm/tp (%) | EVALUATION |
|---|---|---|---|---|---|---|
| 1 | $3.067 \times 10^{-4}$ | $1.243 \times 10^{10}$ | $1.673 \times 10^{-2}$ | $7.942 \times 10^{-5}$ | 0.475 | NG |
| 2 | $3.067 \times 10^{-4}$ | $1.243 \times 10^{10}$ | $1.415 \times 10^{-2}$ | $7.942 \times 10^{-5}$ | 0.561 | OK |
| 3 | $3.067 \times 10^{-4}$ | $1.243 \times 10^{10}$ | $1.314 \times 10^{-2}$ | $7.942 \times 10^{-5}$ | 0.604 | OK |
| 4 | $3.067 \times 10^{-4}$ | $1.243 \times 10^{10}$ | $1.227 \times 10^{-2}$ | $7.942 \times 10^{-5}$ | 0.647 | OK |
| 5 | $3.067 \times 10^{-4}$ | $1.243 \times 10^{10}$ | $1.082 \times 10^{-2}$ | $7.942 \times 10^{-5}$ | 0.734 | NG |
| 6 | $2.520 \times 10^{-4}$ | $1.866 \times 10^{10}$ | $1.163 \times 10^{-2}$ | $3.525 \times 10^{-5}$ | 0.303 | NG |
| 7 | $2.520 \times 10^{-4}$ | $1.513 \times 10^{10}$ | $1.163 \times 10^{-2}$ | $5.362 \times 10^{-5}$ | 0.461 | NG |
| 8 | $3.067 \times 10^{-4}$ | $1.243 \times 10^{10}$ | $1.415 \times 10^{-2}$ | $7.942 \times 10^{-5}$ | 0.561 | OK |
| 9 | $3.442 \times 10^{-4}$ | $1.108 \times 10^{10}$ | $1.589 \times 10^{-2}$ | $1.001 \times 10^{-4}$ | 0.630 | OK |
| 10 | $2.300 \times 10^{-4}$ | $1.866 \times 10^{10}$ | $4.600 \times 10^{-3}$ | $3.525 \times 10^{-5}$ | 0.766 | NG |
| 11 | $2.300 \times 10^{-4}$ | $1.866 \times 10^{10}$ | $4.313 \times 10^{-3}$ | $3.525 \times 10^{-5}$ | 0.817 | OK |
| 12 | $2.300 \times 10^{-4}$ | $1.866 \times 10^{10}$ | $3.943 \times 10^{-3}$ | $3.525 \times 10^{-5}$ | 0.894 | OK |
| 13 | $2.300 \times 10^{-4}$ | $1.866 \times 10^{10}$ | $3.730 \times 10^{-3}$ | $3.525 \times 10^{-5}$ | 0.945 | OK |
| 14 | $2.300 \times 10^{-4}$ | $1.866 \times 10^{10}$ | $3.450 \times 10^{-3}$ | $3.525 \times 10^{-5}$ | 1.022 | OK |
| 15 | $2.300 \times 10^{-4}$ | $1.866 \times 10^{10}$ | $3.286 \times 10^{-3}$ | $3.525 \times 10^{-5}$ | 1.073 | NG |
| 16 | $2.300 \times 10^{-4}$ | $1.866 \times 10^{10}$ | $3.067 \times 10^{-3}$ | $3.525 \times 10^{-5}$ | 1.150 | NG |
| 17 | $2.080 \times 10^{-4}$ | $2.355 \times 10^{10}$ | $3.566 \times 10^{-3}$ | $2.213 \times 10^{-5}$ | 0.621 | NG |
| 18 | $2.300 \times 10^{-4}$ | $1.866 \times 10^{10}$ | $3.943 \times 10^{-3}$ | $3.525 \times 10^{-5}$ | 0.894 | OK |
| 19 | $2.520 \times 10^{-4}$ | $1.513 \times 10^{10}$ | $4.320 \times 10^{-3}$ | $5.362 \times 10^{-5}$ | 1.241 | NG |
| 20 | $2.080 \times 10^{-4}$ | $2.355 \times 10^{10}$ | $1.920 \times 10^{-3}$ | $2.213 \times 10^{-5}$ | 1.153 | OK |
| 21 | $2.080 \times 10^{-4}$ | $2.355 \times 10^{10}$ | $1.783 \times 10^{-3}$ | $2.213 \times 10^{-5}$ | 1.241 | OK |
| 22 | $2.080 \times 10^{-4}$ | $2.355 \times 10^{10}$ | $1.664 \times 10^{-3}$ | $2.213 \times 10^{-5}$ | 1.330 | OK |
| 23 | $2.080 \times 10^{-4}$ | $2.355 \times 10^{10}$ | $1.560 \times 10^{-3}$ | $2.213 \times 10^{-5}$ | 1.419 | OK |
| 24 | $2.080 \times 10^{-4}$ | $2.355 \times 10^{10}$ | $1.468 \times 10^{-3}$ | $2.213 \times 10^{-5}$ | 1.507 | OK |
| 25 | $2.080 \times 10^{-4}$ | $2.355 \times 10^{10}$ | $1.387 \times 10^{-3}$ | $2.213 \times 10^{-5}$ | 1.596 | OK |
| 26 | $2.080 \times 10^{-4}$ | $2.355 \times 10^{10}$ | $1.314 \times 10^{-3}$ | $2.213 \times 10^{-5}$ | 1.685 | NG |
| 27 | $2.080 \times 10^{-4}$ | $2.355 \times 10^{10}$ | $1.664 \times 10^{-3}$ | $2.213 \times 10^{-5}$ | 1.330 | OK |
| 28 | $2.300 \times 10^{-4}$ | $1.866 \times 10^{10}$ | $1.840 \times 10^{-3}$ | $3.525 \times 10^{-5}$ | 1.916 | NG |
| 29 | $2.520 \times 10^{-4}$ | $1.513 \times 10^{10}$ | $2.016 \times 10^{-3}$ | $5.362 \times 10^{-5}$ | 2.660 | NG |

FIG. 8A

MATERIALS A5052

| No. | PLATE THICKNESS (mm) | NOZZLE DIAMETER (mm) | GAS PRESSURE (MPa) | OXYGEN CONCENTRATION (%) | FOCUS OFFSET (mm) | CUTTING SPEED (m/min) |
|---|---|---|---|---|---|---|
| 1 | 4 | 4 | 0.9 | 0.13 | 2.5 | 1.4 |
| 2 | 4 | 4 | 0.9 | 0.13 | 2.5 | 1.6 |
| 3 | 4 | 4 | 0.9 | 0.13 | 2.5 | 1.8 |
| 4 | 4 | 4 | 0.9 | 0.13 | 2.5 | 2.0 |
| 5 | 4 | 4 | 0.9 | 0.13 | 2.5 | 2.2 |
| 6 | 4 | 4 | 0.9 | 0.13 | 2.5 | 2.4 |
| 7 | 4 | 4 | 0.9 | 0.13 | 2.5 | 2.0 |
| 8 | 4 | 4 | 0.9 | 0.13 | 2.5 | 2.0 |
| 9 | 4 | 4 | 0.9 | 0.13 | 2.5 | 2.0 |
| 10 | 3 | 2 | 1.4 | 0.20 | 4.0 | 4.0 |
| 11 | 3 | 2 | 1.4 | 0.20 | 4.0 | 4.5 |
| 12 | 3 | 2 | 1.4 | 0.20 | 4.0 | 4.9 |
| 13 | 3 | 2 | 1.4 | 0.20 | 4.0 | 5.3 |
| 14 | 3 | 2 | 1.4 | 0.20 | 4.0 | 5.7 |
| 15 | 3 | 2 | 1.4 | 0.20 | 4.0 | 6.1 |
| 16 | 3 | 2 | 1.6 | 0.20 | 4.0 | 4.5 |
| 17 | 3 | 2 | 1.6 | 0.20 | 4.0 | 4.5 |
| 18 | 3 | 2 | 1.6 | 0.20 | 4.0 | 4.5 |
| 19 | 2 | 2 | 1.6 | 0.34 | 3.0 | 9.0 |
| 20 | 2 | 2 | 1.6 | 0.34 | 3.0 | 9.5 |
| 21 | 2 | 2 | 1.6 | 0.34 | 3.0 | 10.0 |
| 22 | 2 | 2 | 1.6 | 0.34 | 3.0 | 10.5 |
| 23 | 2 | 2 | 1.6 | 0.34 | 3.0 | 11.0 |
| 24 | 2 | 2 | 1.6 | 0.34 | 3.0 | 11.5 |
| 25 | 2 | 2 | 1.6 | 0.34 | 3.0 | 12.0 |
| 26 | 2 | 2 | 1.6 | 0.34 | 3.0 | 10.0 |
| 27 | 2 | 2 | 1.6 | 0.34 | 3.0 | 10.0 |
| 28 | 2 | 2 | 1.6 | 0.34 | 3.0 | 10.0 |

FIG. 8B

MATERIALS A5052

| No. | 44% SPOT DIAMETER (mm) | POWER DENSITY Pd (W/m$^2$) | MOVING TIME tp (s) | MELTING TIME tm (s) | tm/tp (%) | EVALUATION |
|---|---|---|---|---|---|---|
| 1 | $2.520 \times 10^{-4}$ | $1.513 \times 10^{10}$ | $1.080 \times 10^{-2}$ | $3.406 \times 10^{-5}$ | 0.315 | OK |
| 2 | $2.520 \times 10^{-4}$ | $1.513 \times 10^{10}$ | $9.450 \times 10^{-3}$ | $3.406 \times 10^{-5}$ | 0.360 | OK |
| 3 | $2.520 \times 10^{-4}$ | $1.513 \times 10^{10}$ | $8.400 \times 10^{-3}$ | $3.406 \times 10^{-5}$ | 0.405 | OK |
| 4 | $2.520 \times 10^{-4}$ | $1.513 \times 10^{10}$ | $7.560 \times 10^{-3}$ | $3.406 \times 10^{-5}$ | 0.451 | OK |
| 5 | $2.520 \times 10^{-4}$ | $1.513 \times 10^{10}$ | $6.873 \times 10^{-3}$ | $3.406 \times 10^{-5}$ | 0.496 | OK |
| 6 | $2.520 \times 10^{-4}$ | $1.513 \times 10^{10}$ | $6.300 \times 10^{-3}$ | $3.406 \times 10^{-5}$ | 0.541 | NG |
| 7 | $2.080 \times 10^{-4}$ | $2.355 \times 10^{10}$ | $6.240 \times 10^{-3}$ | $1.406 \times 10^{-5}$ | 0.225 | NG |
| 8 | $2.300 \times 10^{-4}$ | $1.866 \times 10^{10}$ | $6.900 \times 10^{-3}$ | $2.239 \times 10^{-5}$ | 0.325 | OK |
| 9 | $2.520 \times 10^{-4}$ | $1.513 \times 10^{10}$ | $7.560 \times 10^{-3}$ | $3.406 \times 10^{-4}$ | 0.451 | OK |
| 10 | $2.080 \times 10^{-4}$ | $2.355 \times 10^{10}$ | $3.120 \times 10^{-3}$ | $1.406 \times 10^{-5}$ | 0.451 | NG |
| 11 | $2.080 \times 10^{-4}$ | $2.355 \times 10^{10}$ | $2.773 \times 10^{-3}$ | $1.406 \times 10^{-5}$ | 0.507 | OK |
| 12 | $2.080 \times 10^{-4}$ | $2.355 \times 10^{10}$ | $2.547 \times 10^{-3}$ | $1.406 \times 10^{-5}$ | 0.552 | OK |
| 13 | $2.080 \times 10^{-4}$ | $2.355 \times 10^{10}$ | $2.355 \times 10^{-3}$ | $1.406 \times 10^{-5}$ | 0.597 | OK |
| 14 | $2.080 \times 10^{-4}$ | $2.355 \times 10^{10}$ | $2.189 \times 10^{-3}$ | $1.406 \times 10^{-5}$ | 0.642 | OK |
| 15 | $2.080 \times 10^{-4}$ | $2.355 \times 10^{10}$ | $2.046 \times 10^{-3}$ | $1.406 \times 10^{-5}$ | 0.687 | NG |
| 16 | $2.080 \times 10^{-4}$ | $2.355 \times 10^{10}$ | $2.773 \times 10^{-3}$ | $1.406 \times 10^{-5}$ | 0.507 | OK |
| 17 | $2.300 \times 10^{-4}$ | $1.866 \times 10^{10}$ | $3.067 \times 10^{-3}$ | $2.239 \times 10^{-5}$ | 0.730 | NG |
| 18 | $2.520 \times 10^{-4}$ | $1.513 \times 10^{10}$ | $3.360 \times 10^{-3}$ | $3.406 \times 10^{-5}$ | 1.014 | NG |
| 19 | $2.080 \times 10^{-4}$ | $2.355 \times 10^{10}$ | $1.387 \times 10^{-3}$ | $1.406 \times 10^{-5}$ | 1.014 | OK |
| 20 | $2.080 \times 10^{-4}$ | $2.355 \times 10^{10}$ | $1.314 \times 10^{-3}$ | $1.406 \times 10^{-5}$ | 1.070 | OK |
| 21 | $2.080 \times 10^{-4}$ | $2.355 \times 10^{10}$ | $1.248 \times 10^{-3}$ | $1.406 \times 10^{-5}$ | 1.126 | OK |
| 22 | $2.080 \times 10^{-4}$ | $2.355 \times 10^{10}$ | $1.189 \times 10^{-3}$ | $1.406 \times 10^{-5}$ | 1.183 | OK |
| 23 | $2.080 \times 10^{-4}$ | $2.355 \times 10^{10}$ | $1.135 \times 10^{-3}$ | $1.406 \times 10^{-5}$ | 1.239 | OK |
| 24 | $2.080 \times 10^{-4}$ | $2.355 \times 10^{10}$ | $1.085 \times 10^{-3}$ | $1.406 \times 10^{-5}$ | 1.295 | NG |
| 25 | $2.080 \times 10^{-4}$ | $2.355 \times 10^{10}$ | $1.040 \times 10^{-3}$ | $1.406 \times 10^{-5}$ | 1.352 | NG |
| 26 | $2.080 \times 10^{-4}$ | $2.355 \times 10^{10}$ | $1.248 \times 10^{-3}$ | $1.406 \times 10^{-5}$ | 1.126 | OK |
| 27 | $2.300 \times 10^{-4}$ | $1.866 \times 10^{10}$ | $1.380 \times 10^{-3}$ | $2.239 \times 10^{-5}$ | 1.623 | NG |
| 28 | $2.520 \times 10^{-4}$ | $1.513 \times 10^{10}$ | $1.512 \times 10^{-3}$ | $3.406 \times 10^{-5}$ | 2.253 | NG |

LASER PROCESSING MACHINE AND LASER PROCESSING METHOD

TECHNICAL FIELD

The present disclosure relates to a laser processing machine and a laser processing method that cuts a plate material of aluminum by irradiating with a laser beam.

BACKGROUND ART

A laser processing machine has been widely used that cuts a workpiece by irradiating the workpiece with a laser beam emitted from a laser oscillator. As the laser oscillator, various oscillators such as a $CO_2$ laser oscillator, a fiber laser oscillator, or a direct diode laser oscillator (DDL oscillator) can be used.

The $CO_2$ laser oscillator is large in size and requires a high cost. On the other hand, the fiber laser oscillator or the DDL oscillator can be reduced in size and requires a low running cost. In addition, the wavelength of a laser beam emitted from the $CO_2$ laser oscillator is about 10 μm. On the other hand, the wavelength of a laser beam emitted from the fiber laser oscillator or the DDL oscillator is about 1 μm. Accordingly, the laser beam emitted from the fiber laser oscillator or the DDL oscillator has a small beam waist and a high power density, and it is suitable for processing a plate material having a thin plate thickness with a high speed.

CITATION LIST

Patent Literature

[Patent Literature 1]: Japanese Unexamined Patent Application Publication No. 11-170077
[Patent Literature 2]: Japanese Translation of PCT International Application Publication No. JP-T-2015-500571

Non-Patent Literature

[Non-Patent Literature 1]: Katayama, "Introduction to the Lecture Note—A Class in Joining & Welding, Chapter 1: Welding processes and equipment, (1-4): Laser Welding", Journal of the Japanese Welding Society, Vol. 78 (2009), Issue 2, The Japan Welding Society, March 2009, p. 124 to 138

SUMMARY OF THE INVENTION

In a case where a laser processing machine cuts a plate material as a workpiece including aluminum as a major component using a 1 μm band laser beam emitted from a fiber laser oscillator or a DDL oscillator, dross is likely to be formed. Patent Literature 1 discloses a method of preventing formation of dross. However, with the method described in Patent Literature 1, the formation of dross cannot be sufficiently prevented. Therefore, a new method of sufficiently preventing the formation of dross during the cutting of a plate material of aluminum is desired.

An object of an embodiment is to provide a laser processing machine and a laser processing method in which a plate material of aluminum can be cut with a high cutting quality while sufficiently preventing the formation of dross.

A first aspect of an embodiment provides a laser processing machine including: a laser oscillator configured to emit a laser beam having a wavelength of a 1 μm band; and a laser processing unit configured to cut a plate material of aluminum having a material code of 1000 series by irradiating the plate material with the laser beam emitted from the laser oscillator and moving an irradiation position of the laser beam relative to the plate material, wherein a period of time during which the laser beam irradiated on the plate material moves through an inner region of an area of a beam spot of the laser beam that ranges from a center of the beam spot to an area corresponding to a thermal energy of 44% with respect to a total thermal energy of the area of the beam spot is set as a moving time tp, in a case where "c" represents a specific heat of the plate material, "ρ" represents a density of the plate material, "λ" represents a thermal conductivity of the plate material, "T" represents a melting temperature of the plate material, "T0" represents an environmental temperature, "A" represents a light absorptance of the plate material, and "Pd" represents an energy density of the inner region, a time calculated from Equation (1) is set as a melting time tm during which the plate material is melted, and in a case where a plate thickness of the plate material is represented by x and a value of tm/tp obtained by dividing the melting time tm by the moving time tp is represented by y, the laser processing unit cuts the plate material by setting the value y between a lower limit value obtained from Equation (2) and an upper limit value obtained from Equation (3).

$$tm = c \times \rho \times \lambda \times \pi [(T-T0)/(2 \times A \times Pd)]^2 \qquad (1)$$

$$y = 0.0027 e^{0.36x} \qquad (2)$$

$$y = 0.0026 e^{0.4512x} \qquad (3)$$

A second aspect of an embodiment provides a laser processing machine including: a laser oscillator configured to emit a laser beam having a wavelength of a 1 μm band; and a laser processing unit configured to cut a plate material of aluminum having a material code of 5000 series by irradiating the plate material with the laser beam emitted from the laser oscillator and moving an irradiation position of the laser beam relative to the plate material, wherein a period of time during which the laser beam irradiated on the plate material moves through an inner region of an area of a beam spot of the laser beam that ranges from a center of the beam spot to an area corresponding to a thermal energy of 44% with respect to a total thermal energy of the area of the beam spot is set as a moving time tp, in a case where "c" represents a specific heat of the plate material, "ρ" represents a density of the plate material, "λ" represents a thermal conductivity of the plate material, "T" represents a melting temperature of the plate material, "T0" represents an environmental temperature, "A" represents a light absorptance of the plate material, and "Pd" represents an energy density of the inner region, a time calculated from Equation (1) is set as a melting time tm during which the plate material is melted, and in a case where a plate thickness of the plate material is represented by x and a value of tm/tp obtained by dividing the melting time tm by the moving time tp is represented by y, the laser processing unit cuts the plate material by setting the value y between a lower limit value obtained from Equation (4) and an upper limit value obtained from Equation (5).

$$tm = c \times \rho \times \lambda \times \pi [(T-T0)/(2 \times A \times Pd)]^2 \qquad (1)$$

$$y = 0.0009 e^{0.5839x} \qquad (4)$$

$$y = 0.0019 e^{0.4582x} \qquad (5)$$

A third aspect of an embodiment provides a laser processing method including: irradiating a plate material of aluminum having a material code of 1000 series with a laser beam having a wavelength of a 1 μm band; cutting the plate material by moving an irradiation position of the laser beam relative to the plate material, wherein a period of time during which the laser beam irradiated on the plate material moves through an inner region of an area of a beam spot of the laser beam that ranges from a center of the beam spot to an area corresponding to a thermal energy of 44% with respect to a total thermal energy of the area of the beam spot is set as a moving time tp, in a case where "c" represents a specific heat of the plate material, "ρ" represents a density of the plate material, "λ" represents a thermal conductivity of the plate material, "T" represents a melting temperature of the plate material, "T0" represents an environmental temperature, "A" represents a light absorptance of the plate material, and "Pd" represents an energy density of the inner region, a time calculated from Equation (1) is set as a melting time tm during which the plate material is melted, and in a case where a plate thickness of the plate material is represented by x and a value of tm/tp obtained by dividing the melting time tm by the moving time tp is represented by y, the plate material is cut by setting the value y between a lower limit value obtained from Equation (2) and an upper limit value obtained from Equation (3).

$$tm = c \times \rho \times \lambda \times \pi [(T-T0)/(2 \times A \times Pd)]^2 \quad (1)$$

$$y = 0.0027 e^{0.36x} \quad (2)$$

$$y = 0.0026 e^{0.4512x} \quad (3)$$

A fourth aspect of an embodiment provides a laser processing method including: irradiating a plate material of aluminum having a material code of 5000 series with a laser beam having a wavelength of a 1 μm band; cutting the plate material by moving an irradiation position of the laser beam relative to the plate material, wherein a period of time during which the laser beam irradiated on the plate material moves through an inner region of an area of a beam spot of the laser beam that ranges from a center of the beam spot to an area corresponding to a thermal energy of 44% with respect to a total thermal energy of the area of the beam spot is set as a moving time tp, in a case where "c" represents a specific heat of the plate material, "ρ" represents a density of the plate material, "λ" represents a thermal conductivity of the plate material, "T" represents a melting temperature of the plate material, "T0" represents an environmental temperature, "A" represents a light absorptance of the plate material, and "Pd" represents an energy density of the inner region, a time calculated from Equation (1) is set as a melting time tm during which the plate material is melted, and in a case where a plate thickness of the plate material is represented by x and a value of tm/tp obtained by dividing the melting time tm by the moving time tp is represented by y, the plate material is cut by setting the value y between a lower limit value obtained from Equation (4) and an upper limit value obtained from Equation (5).

$$tm = c \times \rho \times \lambda \times \pi [(T-T0)/(2 \times A \times Pd)]^2 \quad (1)$$

$$y = 0.0009 e^{0.5839x} \quad (4)$$

$$y = 0.0019 e^{0.4582x} \quad (5)$$

In accordance with the laser processing machine and the laser processing method according to an embodiment, a plate material of aluminum can be cut with a high cutting quality while sufficiently preventing the formation of dross.

BRIEF DESCRIPTION OF THE DRAWINGS

FIG. 6A is a table illustrating parameters of each sample when a plate material of aluminum having a material code of 1000 series is cut.

FIG. 6B is a table illustrating a relationship between an index and an evaluation result when the plate material of aluminum having the material code of 1000 series is cut.

FIG. 8A is a table illustrating parameters of each sample when a plate material of aluminum having a material code of 5000 series is cut.

FIG. 8B is a table illustrating a relationship between an index and an evaluation result when the plate material of aluminum having a material code of 5000 series is cut.

MODES FOR CARRYING OUT THE INVENTION

Hereinafter, a laser processing machine and a laser processing method according to an embodiment will be described with reference to the accompanying drawings. In an embodiment, a case where a fiber laser oscillator or a DDL oscillator is used as a laser oscillator that emits a laser beam having a wavelength of a 1 μm band will be described. The wavelength of a laser beam emitted from the fiber laser oscillator is typically 1,060 nm to 1,080 nm, and the wavelength of a laser beam emitted from the DDL oscillator is typically 910 nm to 950 nm. A wavelength range of 900 nm to 1,100 nm will be referred to as a "1 μm band".

Figure 1:
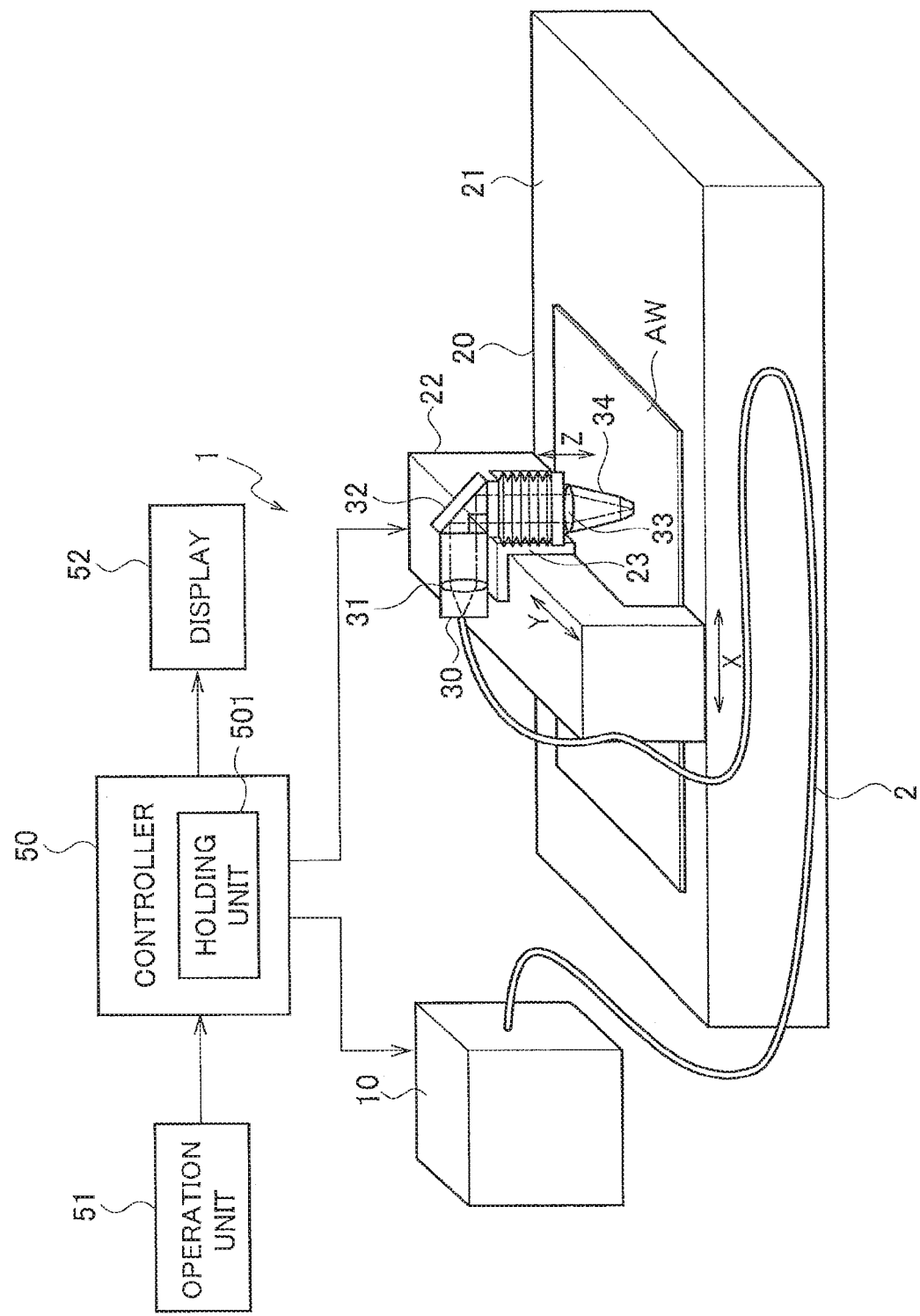
FIG. 1 is a perspective view illustrating an overall configuration example of a laser processing machine according to an embodiment.

As illustrated in FIG. 1, a laser processing machine cuts a material AW (hereinafter, referred to as an "aluminum plate material AW") including aluminum as a major component by irradiating the aluminum plate material AW with a laser beam indicated by a one-dot chain line. The laser processing machine 1 includes a laser oscillator 10, a laser processing unit 20, a process fiber 2, a controller 50, an operation unit 51, and a display 52. The controller 50 includes a holding unit 501. The holding unit 501 may be provided outside the controller 50. The controller 50 can be composed of an NC device.

The controller 50 controls the laser oscillator 10 and the laser processing unit 20. An operator can set various parameters for processing the aluminum plate material AW by operating the operation unit 51. The controller 50 causes the laser processing machine 1 to process the aluminum plate material AW based on parameters that are automatically set or manually set by the operation unit 51. The controller 50 causes the display 52 to display various kinds of information.

The laser oscillator 10 generates and emits a laser beam having a wavelength of a 1 μm band. The laser oscillator 10 is the fiber laser oscillator or the DDL oscillator. The laser oscillator other than the fiber laser oscillator or the DDL oscillator may also be used as long as it emits a laser beam having a wavelength of a 1 μm band.

An input end side of the process fiber 2 is connected to the laser oscillator 10, and an output end side of the process fiber is connected to the laser processing unit 20. The process fiber 2 is mounted along cable ducts (not illustrated) of an X-axis and a Y-axis disposed in the laser processing unit 20. The process fiber 2 transmits the laser beam emitted from the laser oscillator 10 to the laser processing unit 20.

The laser processing unit 20 includes: a processing table 21 on which the aluminum plate material AW is placed; a gate-type X-axis carriage 22 that is movable on the processing table 21 in an X-axis direction (a left-right direction in FIG. 1); and a Y-axis carriage 23 that is movable on the X-axis carriage 22 in a Y-axis direction (a front-back direction in FIG. 1) perpendicular to the X-axis. In addition, the laser processing unit 20 includes a collimator unit 30 that is fixed to the Y-axis carriage 23.

The collimator unit 30 includes: a collimator lens 31 that collimates the laser beam transmitted from the output end of the process fiber 2 to obtain a substantially parallel beam flux; and a bend mirror 32 that reflects the laser beam, which is converted into the substantially parallel beam flux, downward in a Z-axis direction (an up-down direction in FIG. 1) perpendicular to the X-axis and the Y-axis. In addition, the collimator unit 30 includes: a focusing lens 33 that focuses the laser beam reflected from the bend mirror 32 into a high energy density; and a processing head 34.

The collimator lens 31, the bend mirror 32, the focusing lens 33, and the processing head 34 are fixed into the collimator unit 30 in a state where an optical axis is adjusted in advance. The focusing lens 33 is a single focus lens.

Figure 2:
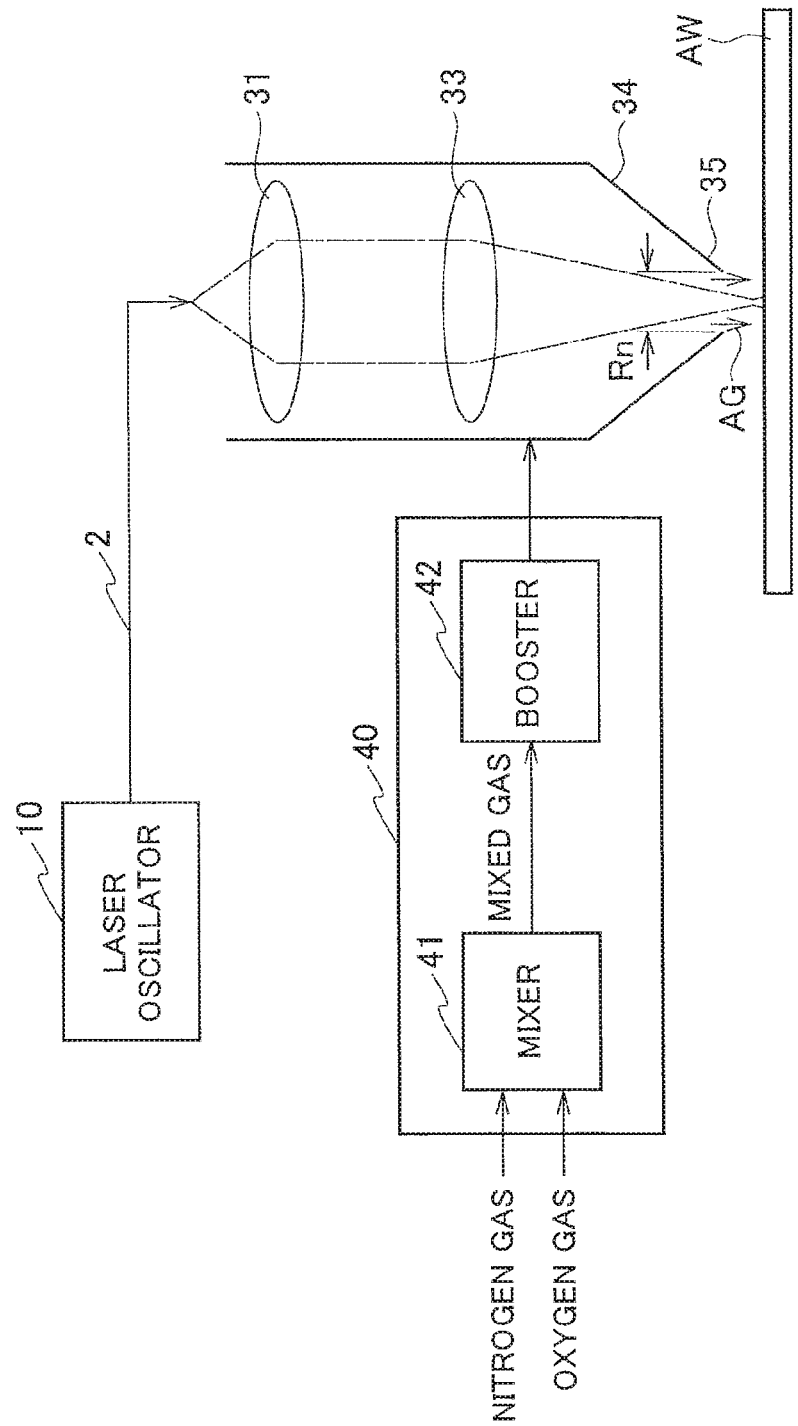
FIG. 2 is a diagram illustrating a schematic configuration example of a mixed gas supply unit of the laser processing machine according to an embodiment.

As illustrated in FIG. 2, the laser beam that is focused by the focusing lens 33 is emitted from a nozzle 35 of the tip portion of the processing head 34 and is irradiated on the aluminum plate material AW. Specifically, it is preferable that the aluminum plate material AW is irradiated with the laser beam in a state where a beam waist (focusing position) is adjusted to be positioned slightly further to the nozzle 35 side (processing head 34 side) than the aluminum plate material AW. In order to correct the focusing position, the collimator lens 31 may be configured to be movable in the X-axis direction.

The collimator unit 30 is fixed to the Y-axis carriage 23 that is movable in the Y-axis direction, and the Y-axis carriage 23 is provided in the X-axis carriage 22 that is movable in the X-axis direction. Accordingly, the laser processing unit 20 can move to a position where the aluminum plate material AW is irradiated with the laser beam emitted from the processing head 34 in the X-axis direction and the Y-axis direction.

The laser processing machine 1 includes a mixed gas supply unit 40. The mixed gas supply unit 40 includes: a mixer 41 (oxygen concentration adjuster) that mixes nitrogen gas and oxygen gas with each other; and a booster 42 that adjusts a gas pressure by temporarily storing mixed gas of nitrogen gas and oxygen gas, that is, mixed gas including oxygen to increase the pressure.

Nitrogen gas may be supplied from a liquid nitrogen gas cylinder to the mixer 41, or nitrogen-rich gas purified by a nitrogen separation membrane may be supplied to the mixer, the nitrogen separation membrane being formed of a hollow fiber that can separate nitrogen from air. In addition, oxygen gas may be supplied from an oxygen gas cylinder to the mixer 41, or oxygen-rich gas purified by an oxygen separation membrane may be supplied to the mixer, the oxygen separation membrane being formed of a hollow fiber that can separate oxygen from air.

The mixer 41 mixes nitrogen gas and oxygen gas with each other to adjust the oxygen concentration (vol %) in the mixed gas. For example, the mixer 41 is a mass flow controller that automatically controls the flow rate of the mixed gas through a valve that makes the pressure of the nitrogen gas or the oxygen gas constant. Instead of automatically controlling the flow rate, the mass flow (mass flow rate) may be manually adjusted based on the measurement result of a mass flow meter that simply performs sensing.

Typically, air includes about 21% (vol %) of oxygen and about 78% (vol %) of nitrogen. Therefore, clean air, from which particles are removed, and nitrogen gas may be mixed with each other by the mixer 41 to adjust the oxygen concentration (vol %) of the mixed gas.

The booster 42 supplies the mixed gas having an adjusted pressure into the processing head 34. The mixed gas supplied into the processing head 34 is jetted as assist gas AG from the nozzle 35 of the tip portion of the processing head 34 to the aluminum plate material AW. By performing cutting using the laser beam in combination with the assist gas AG, the melting of the aluminum plate material AW can be promoted. As a result, the cutting speed of the aluminum plate material AW or the surface roughness of a cut edge can be improved, and the formation of dross can be prevented.

With the above-described configuration, the laser processing machine 1 cuts the aluminum plate material AW by irradiating the aluminum plate material AW with the laser beam while jetting the assist gas AG having an adjusted oxygen concentration to the aluminum plate material AW, the assist gas AG being mixed gas of nitrogen gas and oxygen gas.

Instead of the laser processing machine 1 illustrated in FIG. 1, a robot-type laser processing machine may be used.

In the laser oscillator 10, a BPP adjusting device that adjusts beam parameter products (hereinafter, abbreviated as "BPP") is provided, such as described in Patent Literature 2. The BPP is expressed by the product of the radius of a beam waist and a half width at half maximum of a divergence angle of the beam. The BPP adjusting device adjusts the BPP of the laser beam emitted from the laser oscillator 10 to the process fiber 2 to generate a laser beam having a predetermined beam profile.

In the laser oscillator 10, the BPP adjusting device adjusts the BPP of the laser beam. As a result, a laser beam having a so-called ring-shaped beam profile illustrated in FIG. 3 in which the beam intensity at the center portion is low and the beam intensity at the peripheral portion is high is emitted.

Figure 4:
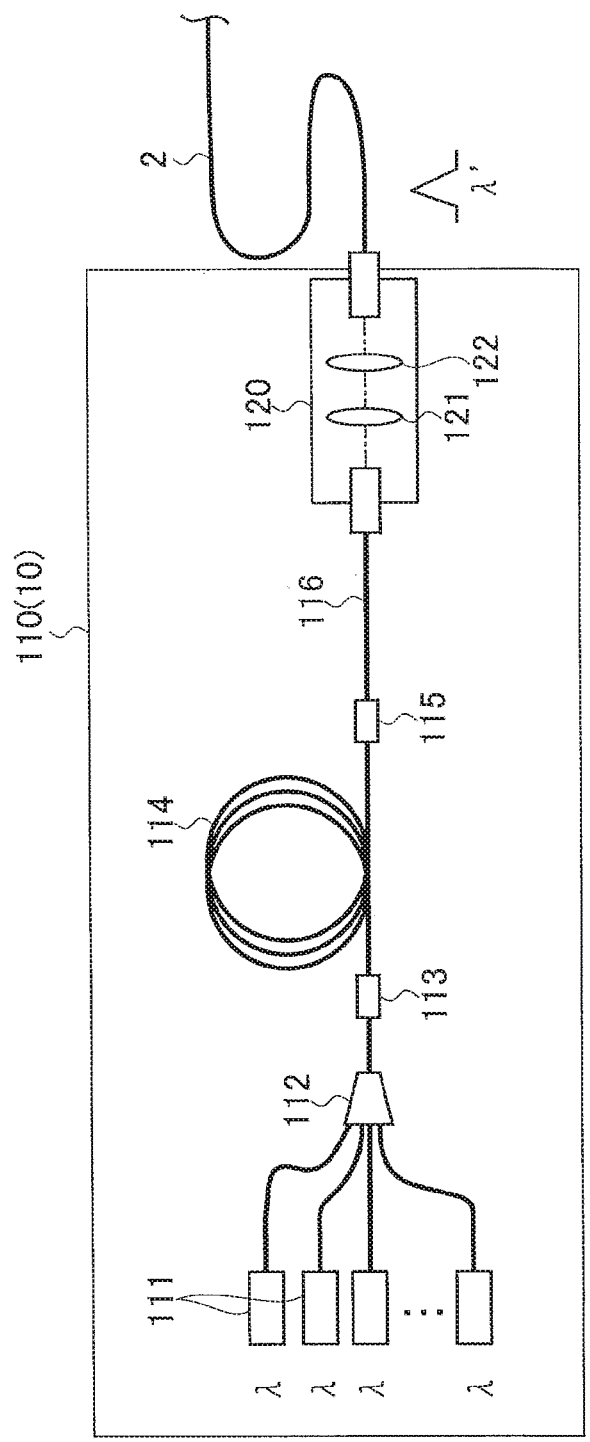
FIG. 4 is a diagram illustrating a schematic configuration in which a laser oscillator illustrated in FIG. 1 is configured as a fiber laser oscillator.

FIG. 4 illustrates a schematic configuration in which the laser oscillator 10 is configured as a fiber laser oscillator 110.

The fiber laser oscillator 110 includes plural laser diodes 111, an excitation combiner 112, two fiber Bragg gratings (FBG) 113 and 115, a Yb-doped fiber 114, a feeding fiber 116, and a beam coupler 120. The beam coupler 120 includes lenses 121 and 122.

Each of the laser diodes 111 emits a laser beam having a wavelength λ. An excitation combiner 112 spatially beam-combines the laser beams emitted from the laser diodes 111.

The laser beam that is spatially beam-combined by the excitation combiner 112 is incident on the Yb-doped fiber 114 through the FBG 113. The Yb-doped fiber 114 is a fiber in which Yb (ytterbium) as a rare earth element is added to a core.

The laser beam incident on the Yb-doped fiber 114 repeatedly reciprocates between the FBG 113 and the FBG 115. As a result, a laser beam having a wavelength λ' of about 1,060 nm to 1,080 nm that is different from the wavelength λ is emitted from the FBG 115.

The laser beam emitted from the FBG 115 is incident on the beam coupler 120 through the feeding fiber 116. The laser beam incident on the beam coupler 120 is incident on the process fiber 2 through the lenses 121 and 122.

The process fiber 2 is composed of one optical fiber, and the laser beam transmitted from the process fiber 2 is not coupled with another laser beam until it reaches the aluminum plate material AW.

Figure 5:
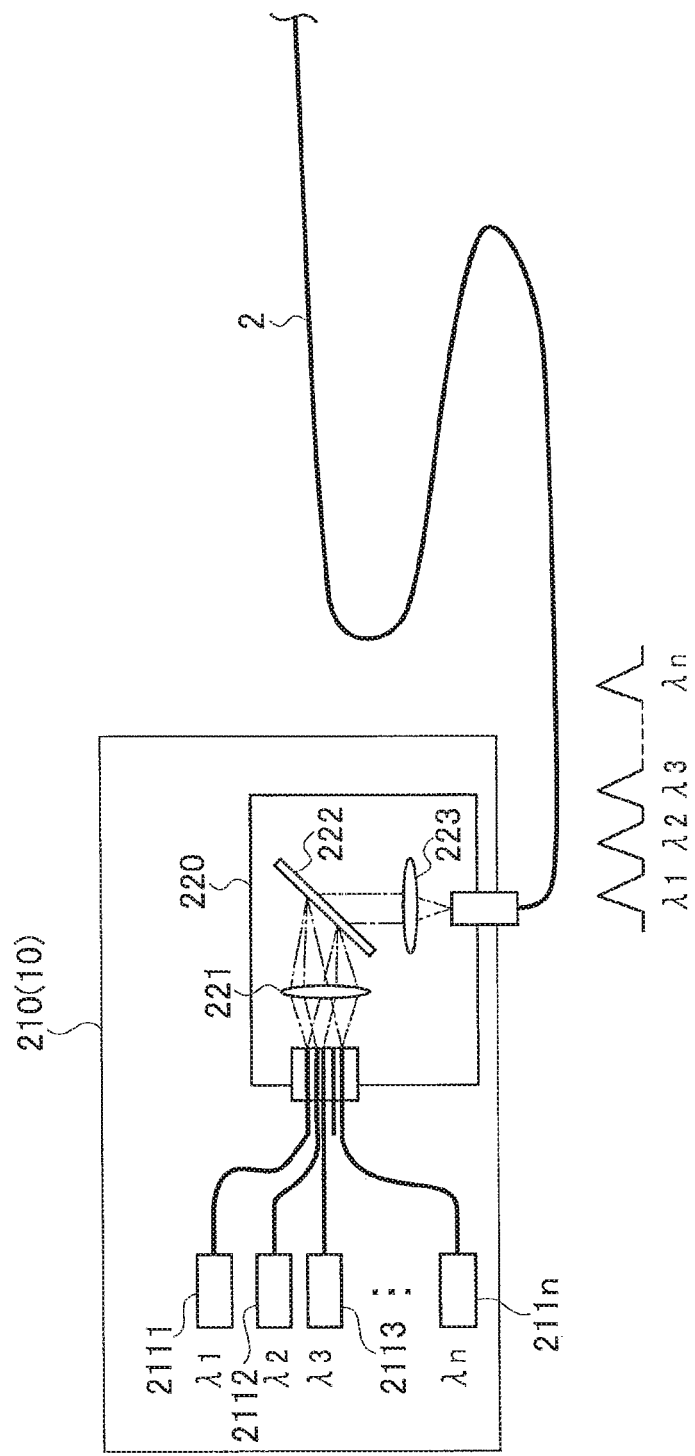
FIG. 5 is a diagram illustrating a schematic configuration in which the laser oscillator illustrated in FIG. 1 is configured as a direct diode laser oscillator.

FIG. 5 illustrates a schematic configuration in which the laser oscillator 10 is configured as a DDL oscillator 210.

The DDL oscillator 210 includes plural laser diodes 2111 to 211n and an optical box 220. Laser beams having different wavelengths λ1 to λn are emitted from the laser diodes 2111 to 211n, respectively. The wavelengths λ1 to λn are 910 nm to 950 nm.

The optical box 220 spatially beam-combines the laser beams emitted from the laser diodes 2111 to 211n. The optical box 220 includes a collimator lens 221, a grating 222, and a focusing lens 223.

The collimator lens 221 collimates the spatially beam-combined laser beam. The grating 222 deflects a direction of the collimated laser beam by 90 degrees, and allows the collimated laser beam to be incident on the focusing lens 223. The focusing lens 223 focuses the laser beam and allows the laser beam to be incident on the process fiber 2.

The process fiber 2 is composed of one optical fiber, and the laser beam transmitted from the process fiber 2 is not coupled with another laser beam until it reaches the aluminum plate material AW.

Representative examples of the aluminum plate material AW include a pure aluminum material having a material code of 1000 series and an Al—Mg material that is an aluminum-magnesium alloy having a material code of 5000 series. Here, not only the pure aluminum material and the Al—Mg material, but also other materials including aluminum as a major component will be referred to as aluminum.

For example, A1050 (material code) that is the pure aluminum material (1000 series) includes 99.5% or higher of the aluminum component and further includes chemical components such as Si, Fe, Cu, Mn, Mg, Zn, or Ti. The Si content is 0.25% or lower, and the Fe content is 0.4% or lower. The content of each of the other chemical components is 0.05% or lower.

A5052 (material code) that is the aluminum-magnesium alloy (5000 series) is a representative material having an intermediate strength among aluminum alloys and is the most widely used alloy. A5052 includes aluminum as a major component and further includes chemical components such as Si, Fe, Cu, Mn, Mg, Cr, or Zn. In A5052, the Mg content is 2.2% to 2.8%.

Next, the present inventors verified conditions under which the formation of dross is prevented, and the aluminum plate material AW can be cut with a high cutting quality. As the laser oscillator 10, the fiber laser oscillator 110 illustrated in FIG. 4 was used, and a laser beam having a short wavelength of 1,060 nm to 1,080 nm was used. The power of the fiber laser oscillator 110 was 2 kW. The incidence angle of the laser beam on a cut end face of the aluminum plate material AW was 84°.

As the aluminum plate material AW, the aluminum materials of A1050 and A5052 were used, and the plate thicknesses were 2 mm, 3 mm, and 4 mm. Regarding the aluminum, the specific heat was 913 (J/kg·° C.), the specific gravity (density) was 2,700 (kg/m$^3$), the thermal conductivity was 225 (W/m° C.), and the maximum melting temperature was 657° C.

In a case where a ratio of the dross height to the thickness of the aluminum plate material AW is 3% or lower at a plate thickness of 2 mm or 3 mm and is 3.5% or lower at a plate thickness of 4 mm, it is considered that the formation of dross is sufficiently prevented and the cutting quality is good.

FIGS. 6A and 6B illustrate the result of an experiment in which aluminum of A1050 was used as the aluminum plate material AW and twenty-nine samples No. 1 to No. 29 were cut using the laser processing machine 1. In FIG. 6A (and FIG. 8A described below), the nozzle diameter represents an opening diameter Rn of the nozzle 35 illustrated in FIG. 2.

As the plate thickness increases, the area to be cut is widened. In a case where the plate thickness is large, it is preferable that the cut width is large. The amount of metal melted during cutting is proportional to the plate thickness, and it is preferable that the opening diameter Rn of the nozzle 35 is large in order to blow off the melted metal within a predetermined period of time.

The gas pressure represents the pressure of the assist gas AG illustrated in FIG. 2. The focus offset represents the distance from the surface of the aluminum plate material AW to the beam waist of the laser beam that is positioned slightly further to the nozzle 35 side. The oxygen concentration represents the oxygen concentration contained in the assist gas AG. The cutting speed represents the moving speed of the irradiation position of the laser beam relative to the aluminum plate material AW.

Figure 3:
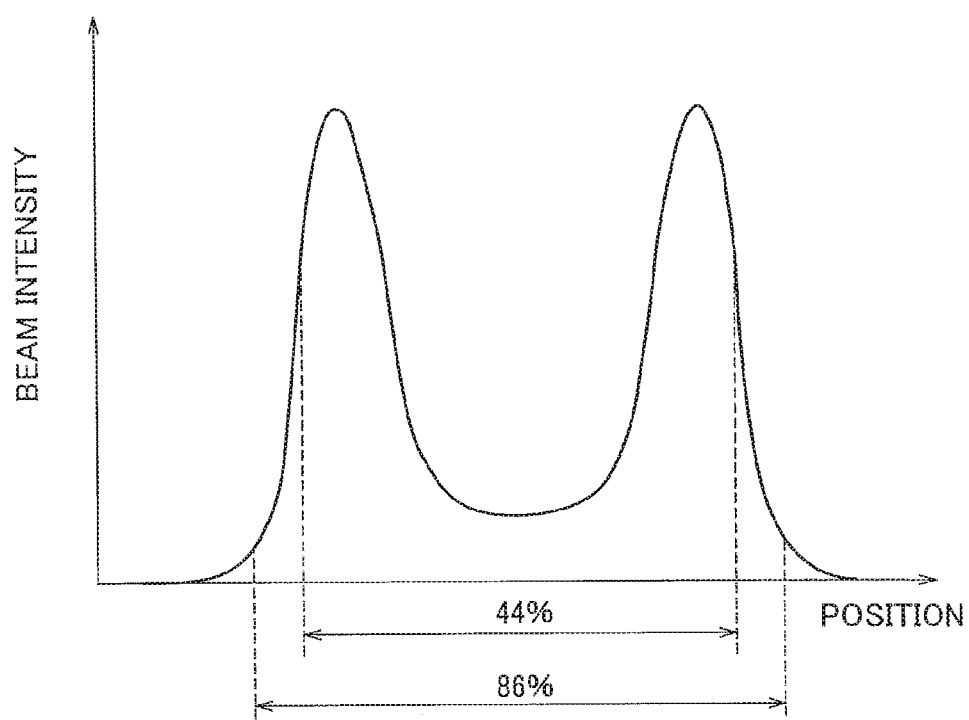
FIG. 3 is a diagram illustrating a ring-shaped beam profile.

In FIG. 6B (and FIG. 8B described below), the 44% spot diameter represents the diameter of an inner region of an area of a beam spot of the laser beam that ranges from the center of the beam spot to an area corresponding to a thermal energy of 44% with respect to a total thermal energy of the area of the beam spot as illustrated in FIG. 3. In an embodiment, the cutting quality is verified based on an index in which the inner region of 44% on the center side is used rather than an inner region, which is commonly used, of an area of a beam spot of the laser beam that ranges from the center of the beam spot to an area corresponding to a thermal energy of 86% with respect to a total thermal energy of the area of the beam spot.

The power density Pd represents the energy density (unit: W/m$^2$) at the 44% spot diameter. The moving time tp represents a period of time during which the laser beam that moves while cutting the aluminum plate material AW moves through the 44% spot diameter. In a case where the 44% spot diameter is represented by d and the cutting speed of the aluminum plate material AW is represented by v, the moving time tp is expressed by d/v. The melting time tm represents a theoretical period of time during which the aluminum plate material AW is melted when the aluminum plate material AW is irradiated with the laser beam of the 44% spot diameter.

The melting time tm is calculated by Equation (1) for both of the aluminum materials A1050 and A5052. In Equation (1), "c" represents the specific heat (unit: J/kg·° C.) of the aluminum (that is, the aluminum plate material AW), "ρ" represents the density of the aluminum (unit: kg/m³), "λ" represents the thermal conductivity of the aluminum (unit: W/m·° C.), "T" represents the melting temperature of the aluminum (unit: ° C.), "T0" represents the environmental temperature (unit: ° C.), and "A" represents the light absorptance of the aluminum (unit: %). Equation (1) can be derived from features described in Non-Patent Literature 1.

$$tm = c \times \rho \times \lambda \times \pi [(T-T0)/(2 \times A \times Pd)]^2 \quad (1)$$

The present inventors evaluated the cutting quality by using tm/tp as an index based on the finding that tm/tp, obtained by dividing the melting time tm by the moving time tp, has an effect on the dross height. In the evaluation column, OK represents that a ratio of the dross height to the thickness of the aluminum plate material AW was 3% or lower at a plate thickness of 2 mm or 3 mm and was 3.5% or lower at a plate thickness of 4 mm, as described above.

NG represents that the ratio of the dross height did not satisfy the above-described conditions and the aluminum plate material AW was not able to be cut. In FIGS. 6A and 6B, in samples other than samples 5 and 26 among the samples evaluated as NG, the aluminum plate material AW was able to be cut, but the ratio of the dross height did not satisfy the above-described conditions. In the samples 5 and 26, the aluminum plate material AW was not able to be cut.

It can be seen from FIG. 6B that, in a case where the aluminum of A1050 having a plate thickness of 2 mm is cut as the aluminum plate material AW, it is preferable that tm/tp is 1.153% to 1.596%. In a case where the aluminum of A1050 having a plate thickness of 3 mm is cut as the aluminum plate material AW, it is preferable that tm/tp is 0.817% to 0.894%. In a case where the aluminum of A1050 having a plate thickness of 4 mm is cut as the aluminum plate material AW, it is preferable that tm/tp is 0.561% to 0.647%.

It is preferable that the focusing position of the laser beam is at a position shifted from the surface of the aluminum plate material AW to the nozzle 35 side by 2.0 mm to 2.5 mm. It is preferable that the opening diameter Rn of the nozzle 35 is 67% to 100% with respect to the plate thickness. It is preferable that the assist gas AG includes 0.17 vol % to 0.40 vol % of oxygen, and it is preferable that the gas pressure is 1.0 MPa to 1.6 MPa.

Figure 7:
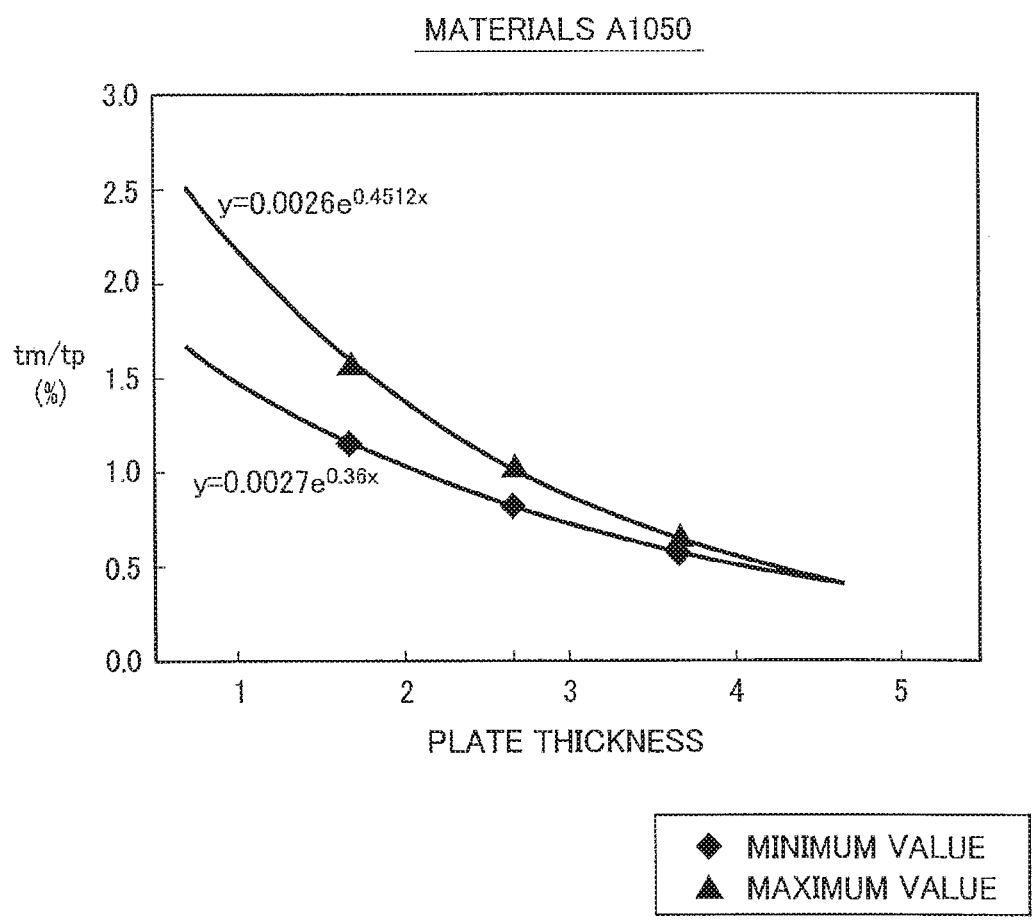
FIG. 7 is a characteristic diagram illustrating approximate expressions representing a relationship between a plate thickness and a lower limit value and an upper limit value of the index when the plate material of aluminum having a material code of 1000 series is cut.

FIG. 7 is a graph in which the horizontal axis represents the plate thickness, the vertical axis represents the value of tm/tp, a lower limit value and an upper limit value of the value of tm/tp at each of the plate thicknesses of 2 mm, 3 mm, and 4 mm are plotted. In a case where the plate thickness is represented by x and the value of tm/tp is represented by y, the lower limit value and the upper limit value can be expressed by approximate expressions represented by Equations (2) and (3), respectively.

$$y = 0.0027 e^{0.36x} \quad (2)$$

$$y = 0.0026 e^{0.4512x} \quad (3)$$

The plate thickness of the aluminum plate material AW is not limited to 2 mm, 3 mm, and 4 mm, and it can be seen from FIG. 7 that as long as the value of tm/tp determined depending on the plate thickness is set between the lower limit value obtained from Equation (2) and the upper limit value obtained from Equation (3), the aluminum plate material AW of A1050 can be cut with a high cutting quality while sufficiently preventing the formation of dross.

Next, the result of an experiment in which aluminum of A5052 was used as the aluminum plate material AW will be described. FIGS. 8A and 8B illustrate the result of an experiment in which aluminum of A5052 was used as the aluminum plate material AW, and the twenty-eight samples No. 1 to No. 28 were cut using the laser processing machine 1.

In FIGS. 8A and 8B, in samples other than samples 24 and 25 among samples evaluated as NG, the aluminum plate material AW was able to be cut, but the ratio of the dross height did not satisfy the above-described conditions. In the samples 24 and 25, the aluminum plate material AW was not able to be cut.

It can be seen from FIG. 8B that, in a case where the aluminum of A5052 having a plate thickness of 2 mm is cut as the aluminum plate material AW, it is preferable that tm/tp is 1.104% to 1.239%. In a case where the aluminum of A5052 having a plate thickness of 3 mm is cut as the aluminum plate material AW, it is preferable that tm/tp is 0.507% to 0.642%. In a case where the aluminum of A5052 having a plate thickness of 4 mm is cut as the aluminum plate material AW, it is preferable that tm/tp is 0.315% to 0.496%.

It is preferable that the focusing position of the laser beam is at a position shifted from the surface of the aluminum plate material AW to the nozzle 35 side by 2.5 mm to 4.0 mm. It is preferable that the opening diameter Rn of the nozzle 35 is 67% to 100% with respect to the plate thickness. It is preferable that the assist gas AG includes 0.13 vol % to 0.34 vol % of oxygen, and it is preferable that the gas pressure is 0.9 MPa to 1.6 MPa.

Figure 9:
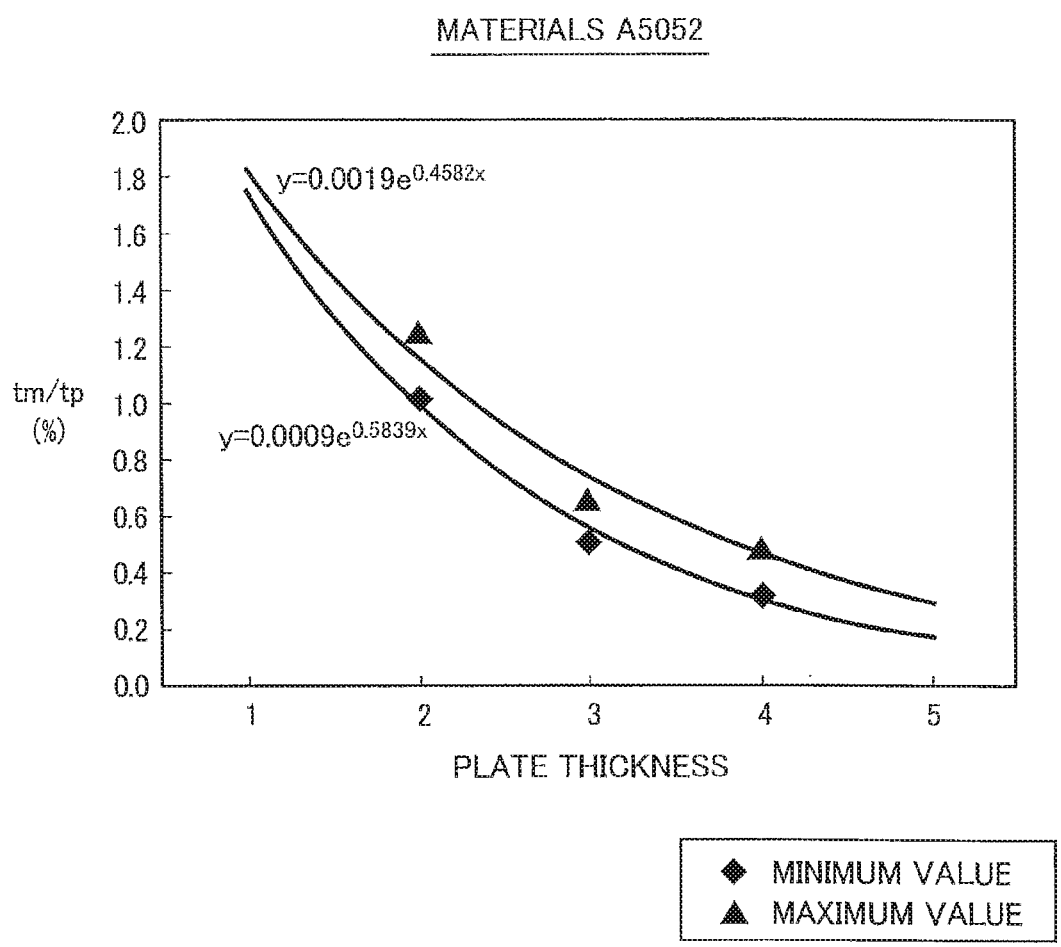
FIG. 9 is a characteristic diagram illustrating approximate expressions representing a relationship between a plate thickness and a lower limit value and an upper limit value of the index when the plate material of aluminum having a material code of 5000 series is cut.

FIG. 9 is a graph in which the horizontal axis represents the plate thickness, the vertical axis represents the value of tm/tp, and a lower limit value and an upper limit value of the value of tm/tp at each of the plate thicknesses of 2 mm, 3 mm, and 4 mm are plotted. In a case where the plate thickness is represented by x and the value of tm/tp is represented by y, the lower limit value and the upper limit value can be expressed by approximate Equations represented by Equations (4) and (5), respectively.

$$y = 0.0009 e^{0.5839x} \quad (4)$$

$$y = 0.0019 e^{0.4582x} \quad (5)$$

The plate thickness of the aluminum plate material AW is not limited to 2 mm, 3 mm, and 4 mm, and it can be seen from FIG. 9 that, as long as the value of tm/tp determined depending on the plate thickness is set between the lower limit value obtained from Equation (4) and the upper limit value obtained from Equation (5), the aluminum plate material AW of A5052 can be cut with a high cutting quality while sufficiently preventing the formation of dross.

In FIG. 1, the holding unit 501 holds Equations (2) and (3) and Equations (4) and (5). The controller 50 determines whether or not the value y is set between the lower limit value obtained from Equation (2) and the upper limit value obtained from Equation (3), in a case where a plate material having a predetermined plate thickness formed of aluminum having a material code of 1000 series is cut by the laser processing unit 20 under processing conditions based on set parameters.

The controller 50 determines whether or not the value y is set between the lower limit value obtained from Equation (4) and the upper limit value obtained from Equation (5) in a case where a plate material having a predetermined plate thickness formed of aluminum having a material code of 5000 series is cut by the laser processing unit 20 under processing conditions based on set parameters.

Equations (2) and (3) and Equations (4) and (5) are index approximate curve expressions stored in the holding unit 501, in which a change rate of the value of tm/tp determined depending on the plate thickness is proportional to the value of tm/tp. The approximate expressions can be obtained from differential equations based on the change rate of the value of tm/tp. By calculating constants used for the power of base of natural logarithms and integration constants, the approximate expressions can be slightly adjusted according to a difference between steel manufacturers. The integration constants of Equations (2) to (5) are 0.0027, 0.0026, 0.0009, and 0.0019, respectively.

The respective values of tm/tp may be held in the holding unit 501 after being changed according to a difference between steel manufacturers. Next, the controller 50 may calculate the constants and the integration constants of the approximate expressions to create Equations (2) to (5), and then may hold Equations (2) to (5) in the holding unit 501.

In a case where the aluminum plate material AW is cut by the laser processing unit 20 under set processing conditions, the controller 50 causes the display 52 to display the determination results of whether or not the value y is set between the lower limit value and the upper limit value. The controller 50 causes the display 52 to display different characters, symbols, or images depending on whether or not the value y is set between the lower limit value and the upper limit value.

For example, in a case where the value y is higher than 105% of the lower limit value and is lower than 95% of the upper limit value, the controller 50 causes the display 52 to display the symbol ○ representing "OK". In a case where the value y is 95% to 105% of the lower limit value 50 and is 95% to 105% of the upper limit value, the controller causes the display 52 to display the symbol Δ representing "Caution". In a case where the value y is lower than 95% of the lower limit value and is higher than 105% of the upper limit value, the controller 50 causes the display 52 to display the symbol X representing "NG".

The symbols ○, Δ, and X are merely exemplary, and the controller 50 may cause the display 52 to display characters of "OK", "Caution", and "NG". A range in which "Caution" is displayed is not limited to ±5% of the lower limit value and the upper limit value, and the controller 50 may set the region to be ±3% or ±7% of the lower limit value and the upper limit value.

Before the laser processing unit 20 starts cutting the aluminum plate material AW, the controller 50 causes the display 52 to display the determination result. As a result, an operator can determine whether or not the high cutting quality can be obtained while sufficiently preventing the formation of dross.

The present invention is not limited to the above-described embodiment, and various modifications can be made without departing from the scope of the present invention.

INDUSTRIAL APPLICABILITY

The present invention is applicable to a case where a plate material of aluminum is cut using a laser beam.

The invention claimed is:
1. A laser processing machine comprising:
a laser oscillator configured to emit a laser beam having a wavelength within a range of between 900 nm and 1100 nm; and
a laser processing unit configured to cut a plate material of aluminum having a material code of 1000 series by irradiating the plate material with the laser beam emitted from the laser oscillator and moving an irradiation position of the laser beam relative to the plate material, wherein
a period of time is set as a moving time tp, wherein tp is defined as the period of time during which the laser beam moves a distance equivalent to a distance from a center of a beam spot of the laser beam to a point in the beam spot located on a circumference of a circle whose center is also the center of the beam spot and contains 44% of a total thermal energy of the area of the beam spot,
in a case where "c" represents a specific heat of the plate material, "ρ" represents a density of the plate material, "λ" represents a thermal conductivity of the plate material, "T" represents a melting temperature of the plate material, "T0" represents an environmental temperature, "A" represents a light absorptance of the plate material, and "Pd" represents an energy density of the inner region, a time calculated from Equation (1) is set as a melting time tm during which the plate material is melted,

$$tm = c \times \rho \times \lambda \times \pi [(T-T0)/(2 \times A \times Pd)]^2 \quad (1), \text{ and}$$

in a case where a plate thickness of the plate material is represented by x and a value of tm/tp obtained by dividing the melting time tm by the moving time tp is represented by y, the laser processing unit cuts the plate material by setting the value y between a lower limit value obtained from Equation (2) and an upper limit value obtained from Equation (3), wherein $$y = 0.0027 e^{0.36x} \quad (2)$$

$$y = 0.0026 e^{0.4512x} \quad (3), \text{ and}$$

the laser processing machine further comprising:
a holding unit that holds Equation (2) and Equation (3); and
a controller configured to determine whether or not the value y is set between the lower limit value obtained from Equation (2) and the upper limit value obtained from Equation (3) and causes a display to display a determination result in a case where a plate material having a predetermined plate thickness formed of aluminum having a material code of 1000 series is cut by the laser processing unit under set processing conditions.

2. The laser processing machine according to claim 1, wherein
the plate thickness of the plate material is 2 mm to 4 mm.

3. A laser processing machine comprising:
a laser oscillator configured to emit a laser beam having a wavelength within a range of between 900 nm and 1100 nm; and
a laser processing unit configured to cut a plate material of aluminum having a material code of 5000 series by irradiating the plate material with the laser beam emitted from the laser oscillator and moving an irradiation position of the laser beam relative to the plate material, wherein
a period of time is set as a moving time tp, wherein tp is defined as the period of time during which the laser beam moves a distance equivalent to a distance from a center of a beam spot of the laser beam to a point in the beam spot located on a circumference of a circle whose center is also the center of the beam spot and contains 44% of a total thermal energy of the area of the beam spot, in a case where "c" represents a specific heat of the plate material, "ρ" represents a density of the plate material, "λ" represents a thermal conductivity of the plate material, "T" represents a melting temperature of the plate material, "T0" represents an environmental temperature, "A" represents a light absorptance of the plate material, and "Pd" represents an energy density of the inner region, a time calculated from Equation (1) is set as a melting time tm during which the plate material is melted, $$tm = c \times \rho \times \lambda \times \pi[(T-T0)/(2 \times A \times Pd)]^2 \quad (1), \text{ and}$$

in a case where a plate thickness of the plate material is represented by x and a value of tm/tp obtained by dividing the melting time tm by the moving time tp is represented by y, the laser processing unit cuts the plate material by setting the value y between a lower limit value obtained from Equation (4) and an upper limit value obtained from Equation (5), wherein $$y = 0.0009 e^{0.5839x} \quad (4)$$

$$y = 0.0019 e^{0.4582x} \quad (5), \text{ and}$$

the laser processing machine further comprising:
a holding unit that holds Equation (4) and Equation (5); and
a controller configured to determine whether or not the value y is set between the lower limit value obtained from Equation (4) and the upper limit value obtained from Equation (5) and causes a display to display a determination result in a case where a plate material having a predetermined plate thickness formed of aluminum having a material code of 5000 series is cut by the laser processing unit under set processing conditions.

4. The laser processing machine according to claim 3, wherein
the plate thickness of the plate material is 2 mm to 4 mm.

5. A laser processing method comprising:
irradiating a plate material of aluminum having a material code of 1000 series with a laser beam having a wavelength within a range of between 900 nm and 1100 nm;
cutting the plate material by moving an irradiation position of the laser beam relative to the plate material, wherein
a period of time is set as a moving time tp, wherein tp is defined as the period of time during which the laser beam moves a distance equivalent to a distance from a center of a beam spot of the laser beam to a point in the beam spot located on a circumference of a circle whose center is also the center of the beam spot and contains 44% of a total thermal energy of the area of the beam spot, in a case where "c" represents a specific heat of the plate material, "ρ" represents a density of the plate material, "λ" represents a thermal conductivity of the plate material, "T" represents a melting temperature of the plate material, "T0" represents an environmental temperature, "A" represents a light absorptance of the plate material, and "Pd" represents an energy density of the inner region, a time calculated from Equation (1) is set as a melting time tm during which the plate material is melted, $$tm = c \times \rho \times \lambda \times \pi[(T-T0)/(2 \times A \times Pd)]^2 \quad (1), \text{ and}$$

in a case where a plate thickness of the plate material is represented by x and a value of tm/tp obtained by dividing the melting time tm by the moving time tp is represented by y, the plate material is cut by setting the value y between a lower limit value obtained from Equation (2) and an upper limit value obtained from Equation (3), wherein $$y = 0.0027 e^{0.36x} \quad (2)$$

$$y = 0.0026 e^{0.4512x} \quad (3).$$

6. The laser processing method according to claim 5, wherein
Equations (2) and (3) are held in a holding unit,
determining whether or not the value y is set between the lower limit value obtained from Equation (2) and the upper limit value obtained from Equation (3), in a case where a plate material having a predetermined plate thickness formed of aluminum having a material code of 1000 series is cut under set processing conditions, and
displaying different characters, symbols, or images on a display, based on a determination result depending on whether or not the value y is set between the lower limit value obtained from Equation (2) and the upper limit value obtained from Equation (3).

7. The laser processing method according to claim 5, wherein
the plate thickness of the plate material is 2 mm to 4 mm.

8. A laser processing method comprising:
irradiating a plate material of aluminum having a material code of 5000 series with a laser beam having a wavelength within a range of between 900 nm and 1100 nm;
cutting the plate material by moving an irradiation position of the laser beam relative to the plate material, wherein
a period of time is set as a moving time tp, wherein tp is defined as the period of time during which the laser beam moves a distance equivalent to a distance from a center of a beam spot of the laser beam to a point in the beam spot located on a circumference of a circle whose center is also the center of the beam spot and contains 44% of a total thermal energy of the area of the beam spot, in a case where "c" represents a specific heat of the plate material, "ρ" represents a density of the plate material, "λ" represents a thermal conductivity of the plate material, "T" represents a melting temperature of the plate material, "T0" represents an environmental temperature, "A" represents a light absorptance of the plate material, and "Pd" represents an energy density of the inner region, a time calculated from Equation (1) is set as a melting time tm during which the plate material is melted, $$tm = c \times \rho \times \lambda \times \pi[(T-T0)/(2 \times A \times Pd)]^2 \quad (1), \text{ and}$$

in a case where a plate thickness of the plate material is represented by x and a value of tm/tp obtained by dividing the melting time tm by the moving time tp is represented by y, the plate material is cut by setting the value y between a lower limit value obtained from Equation (4) and an upper limit value obtained from Equation (5), wherein $$y = 0.0009 e^{0.5839x} \quad (4)$$

$$y = 0.0019 e^{0.4582x} \quad (5).$$

9. The laser processing method according to claim 8, wherein

Equations (4) and (5) are held in a holding unit, determining whether or not the value y is set between the lower limit value obtained from Equation (4) and the upper limit value obtained from Equation (5), in a case where a plate material having a predetermined plate thickness formed of aluminum having a material code of 5000 series is cut under set processing conditions, and displaying different characters, symbols, or images on a display, based on a determination result depending on whether or not the value y is set between the lower limit value obtained from Equation (4) and the upper limit value obtained from Equation (5).

10. The laser processing method according to claim 8, wherein the plate thickness of the plate material is 2 mm to 4 mm.

* * * * *